United States Patent
Li et al.

(10) Patent No.: US 9,740,226 B2
(45) Date of Patent: *Aug. 22, 2017

(54) BALANCING POWER SUPPLY AND DEMAND

(71) Applicant: Intel Corporation, Santa Clara, CA (US)

(72) Inventors: Peter T. Li, Portland, OR (US); Don J. Nguyen, Portland, OR (US)

(73) Assignee: Intel Corporation, Santa Clara, CA (US)

(*) Notice: Subject to any disclaimer, the term of this patent is extended or adjusted under 35 U.S.C. 154(b) by 376 days.

This patent is subject to a terminal disclaimer.

(21) Appl. No.: 14/509,632

(22) Filed: Oct. 8, 2014

(65) Prior Publication Data
US 2015/0105925 A1    Apr. 16, 2015

Related U.S. Application Data

(63) Continuation of application No. 13/536,180, filed on Jun. 28, 2012, now Pat. No. 8,884,586, which is a continuation of application No. 12/714,075, filed on Feb. 26, 2010, now Pat. No. 8,242,750, which is a continuation of application No. 11/395,677, filed on Mar. 30, 2006, now abandoned.

(51) Int. Cl.
| | |
|---|---|
| *H02J 7/00* | (2006.01) |
| *G06F 1/00* | (2006.01) |
| *G05F 1/66* | (2006.01) |
| *G06F 1/30* | (2006.01) |
| *G06F 1/32* | (2006.01) |
| *G05B 15/02* | (2006.01) |

(52) U.S. Cl.
CPC .............. *G05F 1/66* (2013.01); *G05B 15/02* (2013.01); *G06F 1/305* (2013.01); *G06F 1/3203* (2013.01); *H02J 7/0068* (2013.01); *Y10T 307/615* (2015.04); *Y10T 307/658* (2015.04)

(58) Field of Classification Search
CPC ......... H02J 7/0068; G06F 1/3203; G05F 1/66
USPC .............................. 320/128, 137, 116; 713/300
See application file for complete search history.

(56) References Cited

U.S. PATENT DOCUMENTS

| | | | | |
|---|---|---|---|---|
| 4,064,485 A | * | 12/1977 | Leyde | .................... G01R 21/00 |
| | | | | 307/39 |
| 4,348,668 A | * | 9/1982 | Gurr | ........................ H02J 3/14 |
| | | | | 307/39 |

(Continued)

OTHER PUBLICATIONS

Final Office Action for U.S. Appl. No. 11/395,677, mailed Jul. 24, 2009.

(Continued)

*Primary Examiner* — M'Baye Diao
(74) *Attorney, Agent, or Firm* — Green, Howard and Mughal LLP

(57) ABSTRACT

A method and apparatus to balance adapter power supply and computing device power demand. In one embodiment, power to/from battery pack(s) maybe controlled by adjusting the output voltage of the power adapter via the current input to the power adapter through a feedback pin to meet power demand of electrical loads. Another embodiment provides a way to adjust the activities of the electrical loads such that neither adapter power rating nor the electrical load power limit is exceeded while avoiding system shutdown.

20 Claims, 3 Drawing Sheets

(56) References Cited

U.S. PATENT DOCUMENTS

| | | | |
|---|---|---|---|
| 5,422,567 A * | 6/1995 | Matsunaga | A61B 18/1206 324/142 |
| 5,465,011 A | 11/1995 | Miller et al. | |
| 5,894,212 A * | 4/1999 | Balogh | H02J 7/0026 320/116 |
| 6,172,884 B1 | 1/2001 | Lanni | |
| 6,291,965 B1 * | 9/2001 | Nagai | H02J 7/0004 320/106 |
| 6,438,360 B1 * | 8/2002 | Alberth, Jr. | H03F 1/0222 330/129 |
| 6,498,460 B1 * | 12/2002 | Atkinson | G06F 1/263 320/135 |
| 6,566,843 B2 * | 5/2003 | Takano | H02J 7/0068 320/114 |
| 6,754,092 B2 * | 6/2004 | McDowell | G06F 1/263 307/39 |
| 6,836,101 B2 * | 12/2004 | Lanni | G05F 1/56 323/221 |
| 7,126,241 B2 | 10/2006 | Popescu-Stanesti et al. | |
| 7,526,659 B2 * | 4/2009 | Sawyers | G06F 1/26 713/300 |
| 7,564,220 B2 * | 7/2009 | Niculae | H02J 7/0013 320/131 |
| 7,592,716 B2 | 9/2009 | Zhu et al. | |
| 7,853,818 B2 * | 12/2010 | Nguyen | G06F 1/263 713/300 |
| 8,111,046 B2 * | 2/2012 | Sawyers | G06F 1/30 320/134 |
| 8,242,750 B2 | 8/2012 | Li et al. | |
| 2004/0085045 A1 | 5/2004 | Nakamura | |
| 2004/0178766 A1 * | 9/2004 | Bucur | H02J 7/0013 320/112 |
| 2005/0083615 A1 | 4/2005 | Rose | |
| 2006/0192530 A1 * | 8/2006 | Nguyen | G06F 1/263 320/128 |
| 2006/0267553 A1 * | 11/2006 | Chuang | H02J 7/02 320/128 |
| 2007/0040516 A1 | 2/2007 | Chen | |
| 2007/0079153 A1 * | 4/2007 | Bain | G06F 1/263 713/300 |
| 2007/0220283 A1 * | 9/2007 | Jen | H02J 7/0004 713/300 |
| 2007/0229024 A1 * | 10/2007 | Li | G06F 1/305 320/111 |
| 2009/0085553 A1 * | 4/2009 | Kumar | H02J 7/0024 323/351 |
| 2010/0077237 A1 * | 3/2010 | Sawyers | G06F 1/26 713/300 |

OTHER PUBLICATIONS

Final Office Action for U.S. Appl. No. 12/714,075, mailed Oct. 21, 2010.
Final Office Action for U.S. Appl. No. 13/536,180, mailed Nov. 19, 2013.
Non Final Office Action for U.S. Appl. No. 11/395,677, mailed Jan. 13, 2009.
Non Final Office Action for U.S. Appl. No. 12/714,075, mailed Mar. 3, 2011.
Non Final Office Action for U.S. Appl. No. 12/714,075, mailed Oct. 12, 2011.
Non Final Office Action for U.S. Appl. No. 12/714,075, mailed Jun. 10, 2010.
Non Final Office Action for U.S. Appl. No. 13/516,180, mailed May 29, 2013.
Notice of Allowance for U.S. Appl. No. 13/536,180, mailed Jul. 8, 2014.
Notice of Allowance for U.S. Appl. No. 12/714,075, mailed Apr. 13, 2012.
Restriction Requirement for U.S. Appl. No. 11/395,677, mailed Aug. 9, 2007.
Nguyen, Don, "Modifying Power Adapter Output", U.S. Appl. No. 11/066,796, filed Feb. 25, 2005.

* cited by examiner

BALANCING POWER SUPPLY AND DEMAND

CROSS-REFERENCE TO RELATED APPLICATIONS

This application is a continuation of, claims the benefit of and priority to U.S. patent application Ser. No. 13/536,180, filed Jun. 28, 2012, entitled "Balancing Power Supply and Demand", which is a continuation of U.S. patent application Ser. No. 12/714,075, filed Feb. 26, 2010, now U.S. Pat. No. 8,242,750 issued Aug. 14, 2012, which is a continuation of U.S. patent application Ser. No. 11/395,677 filed Mar. 30, 2006, all of which are incorporated herein by reference in their entirety.

BACKGROUND INFORMATION

Computer systems are becoming increasing pervasive in our society, including everything from small handheld electronic devices, such as personal data assistants and cellular phones, to application-specific electronic devices, such as set-top boxes, digital cameras, and other consumer electronics, to medium-sized mobile systems such as notebook, sub-notebook, and tablet computers, to desktop systems, servers and workstations. Computer systems typically include one or more processors. A processor manipulates and controls the flow of data in a computer by executing instructions.

To provide more powerful computer systems for consumers, processor designers strive to continually increase the operating speed of the processor. Unfortunately, as processor speed increases, the power consumed by the processor tends to increase as well. Historically, the power consumed by a computer system has been limited by two factors. First, as power consumption increases, the computer tends to run hotter, leading to thermal dissipation problems. Second, the power consumed by a computer system may tax the limits of the power supply used to keep the system operational, reducing battery life in mobile systems and diminishing reliability while increasing cost in larger systems.

For instance, power adapters generally consume more power than most other individual components of the notebook computer. To operate the internal components of notebook computers, external power adapters may be utilized to charge battery pack(s) and to supply power to the rest of the internal components of the notebook computer simultaneously. However, in current designs power adapters may become overheated and/or have functional failures, especially when used in a non-controlled environment.

The present invention addresses this and other issues associated with the prior art.

BRIEF DESCRIPTION OF THE DRAWINGS

Various features of the invention will be apparent from the following description of preferred embodiments as illustrated in the accompanying drawings, in which like reference numerals generally refer to the same parts throughout the drawings. The drawings are not necessarily to scale, the emphasis instead being placed upon illustrating the principles of the inventions.

DETAILED DESCRIPTION

In the following description, for purposes of explanation and not limitation, specific details are set forth such as particular structures, architectures, interfaces, techniques, etc. in order to provide a thorough understanding of the various aspects of the invention. However, it will be apparent to those skilled in the art having the benefit of the present disclosure that the various aspects of the invention may be practiced in other examples that depart from these specific details. In certain instances, descriptions of well-known devices, circuits, and methods are omitted so as not to obscure the description of the present invention with unnecessary detail.

Figure 1:
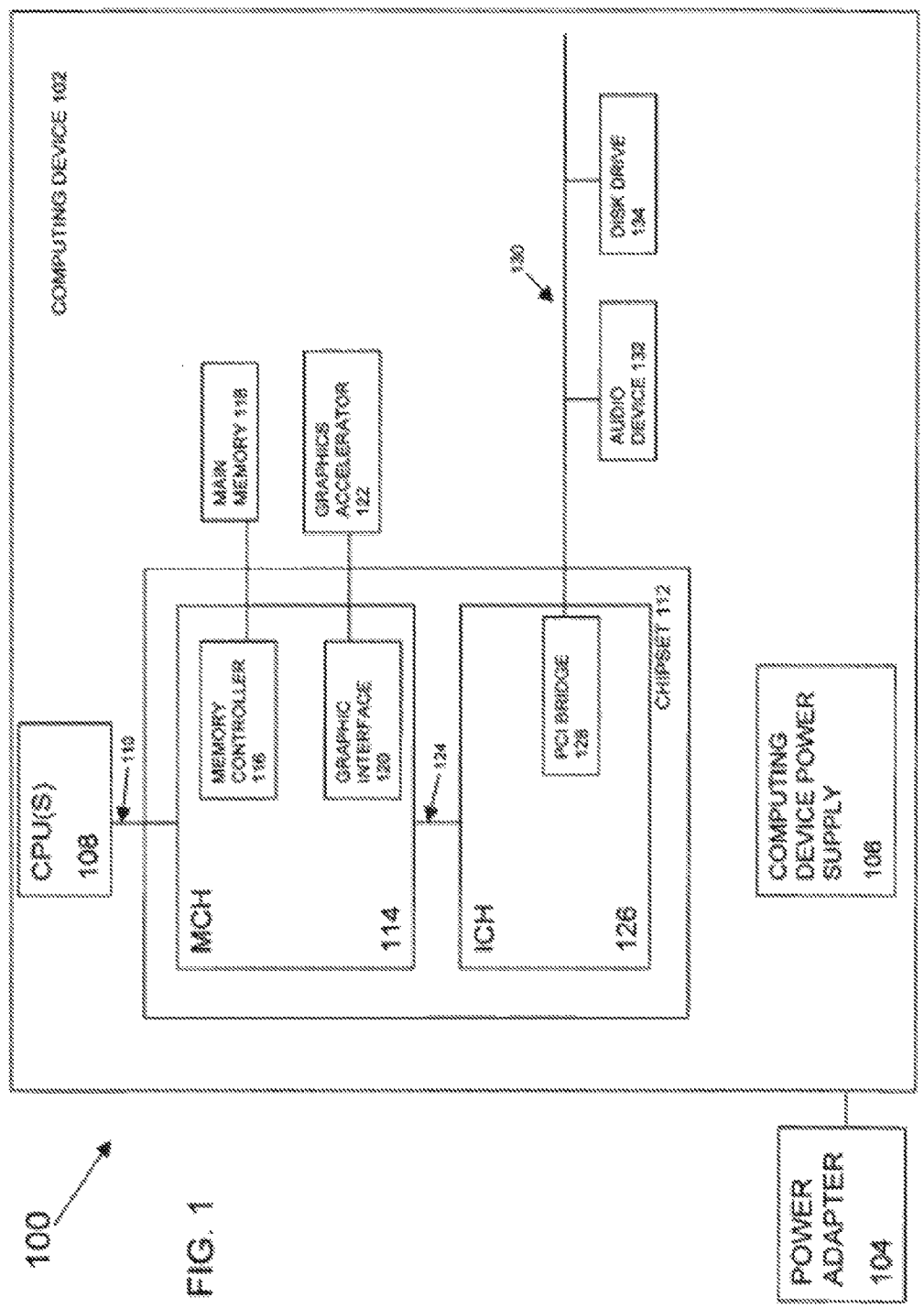
FIG. 1 illustrates a block diagram of a computer system in accordance with an embodiment.

FIG. 1 illustrates a block diagram of a computer system 100 in accordance with an embodiment. The computer system 100 includes a computing device 102 and a power adapter 104 (e.g., to supply electrical power to the computing device 102). The computing device 102 may be any suitable computing device such as a laptop (or notebook) computer, a personal digital assistant, a desktop computing device (e.g., a workstation or a desktop computer), a rack-mounted computing device, and the like.

Electrical power may be provided to various components of the computing device 102 (e.g., through a computing device power supply 106) from one or more of the following sources: one or more battery packs, an alternating current (AC) outlet (e.g., through a transformer and/or adaptor such as a power adapter 104), automotive power supplies, airplane power supplies, and the like. In one embodiment, the power adapter 104 may transform the power supply source output (e.g., the AC outlet voltage of about 110VAC to 240VAC) to a direct current (DC) voltage ranging between about 7VDC to 12.6VDC. Accordingly, the power adapter 104 may be an AC/DC adapter.

The computing device 102 also includes one or more central processing unit(s) (CPUs) 108 coupled to a bus 110. In one embodiment, the CPU 108 is one or more processors in the Pentium® family of processors including the Pentium® II processor family, Pentium® III processors, Pentium® IV processors available from Intel® Corporation of Santa Clara, Calif. Alternatively, other CPUs may be used, such as Intel's Itanium®, XEON™, and Celeron® processors. Also, one or more processors from other manufactures may be utilized. Moreover, the processors may have a single or multi core design.

A chipset 112 is also coupled to the bus 110. The chipset 112 includes a memory control hub (MCH) 114. The MCH 114 may include a memory controller 116 that is coupled to a main system memory 118. The main system memory 118 stores data and sequences of instructions that are executed by the CPU 108, or any other device included in the system 100. In one embodiment, the main system memory 118 includes random access memory (RAM); however, the main system memory 118 may be implemented using other memory types such as dynamic RAM (DRAM), synchronous DRAM (SDRAM), and the like. Additional devices may also be coupled to the bus 110, such as multiple CPUs and/or multiple system memories.

The MCH 114 may also include a graphics interface 120 coupled to a graphics accelerator 122. In one embodiment, the graphics interface 120 is coupled to the graphics accelerator 122 via an accelerated graphics port (AGP). In an embodiment, a display (such as a flat panel display) may be coupled to the graphics interface 120 through, for example, a signal converter that translates a digital representation of an image stored in a storage device such as video memory or system memory into display signals that are interpreted and displayed by the display. The display signals produced by the display device may pass through various control devices before being interpreted by and subsequently displayed on the display.

A hub interface 124 couples the MCH 114 to an input/output control hub (ICH) 126. The ICH 126 provides an interface to input/output (I/O) devices coupled to the computer system 100. The ICH 126 may be coupled to a peripheral component interconnect (PCI) bus. Hence, the ICH 126 includes a PCI bridge 128 that provides an interface to a PCI bus 130. The PCI bridge 128 provides a data path between the CPU 108 and peripheral devices. Additionally, other types of I/O interconnect topologies may be utilized such as the PCI Express™ architecture, available through Intel® Corporation of Santa Clara, Calif.

The PCI bus 130 may be coupled to an audio device 132 and one or more disk drive(s) 134. Other devices may be coupled to the PCI bus 130. In addition, the CPU 108 and the MCH 114 may be combined to form a single chip. Furthermore, the graphics accelerator 122 may be included within the MCH 114 in other embodiments.

Additionally, other peripherals coupled to the ICH 126 may include, in various embodiments, integrated drive electronics (IDE) or small computer system interface (SCSI) hard drive(s), universal serial bus (USB) port(s), a keyboard, a mouse, parallel port(s), serial port(s), floppy disk drive(s), digital output support (e.g., digital video interface (DVI)), and the like. Hence, the computing device 102 may include volatile and/or nonvolatile memory.

Currently, a computer system 100 may not know the power rating of the adapter 104. The output voltage of the adapter 104 is usually a fixed voltage that is not directly controlled by any component in the computing device 102. Both an electrical load and a battery may demand power from the adapter 104, both simultaneously and individually. The power adapter 104 may supply power to the electrical load through VDC and charge a battery through a battery charger. The battery charger usually starts to charge Li-Ion batteries with a constant current. Usually, the power required by the battery does not depend on the power consumption of the electrical load. This may cause problems if the electrical load does not obtain sufficient power from the adapter. The adapter 104 may shut down due to excessive power demand if its protection mechanism functions properly. However, if protection mechanisms do not function properly, the adapter may overheat, resulting in damages.

Figure 2:
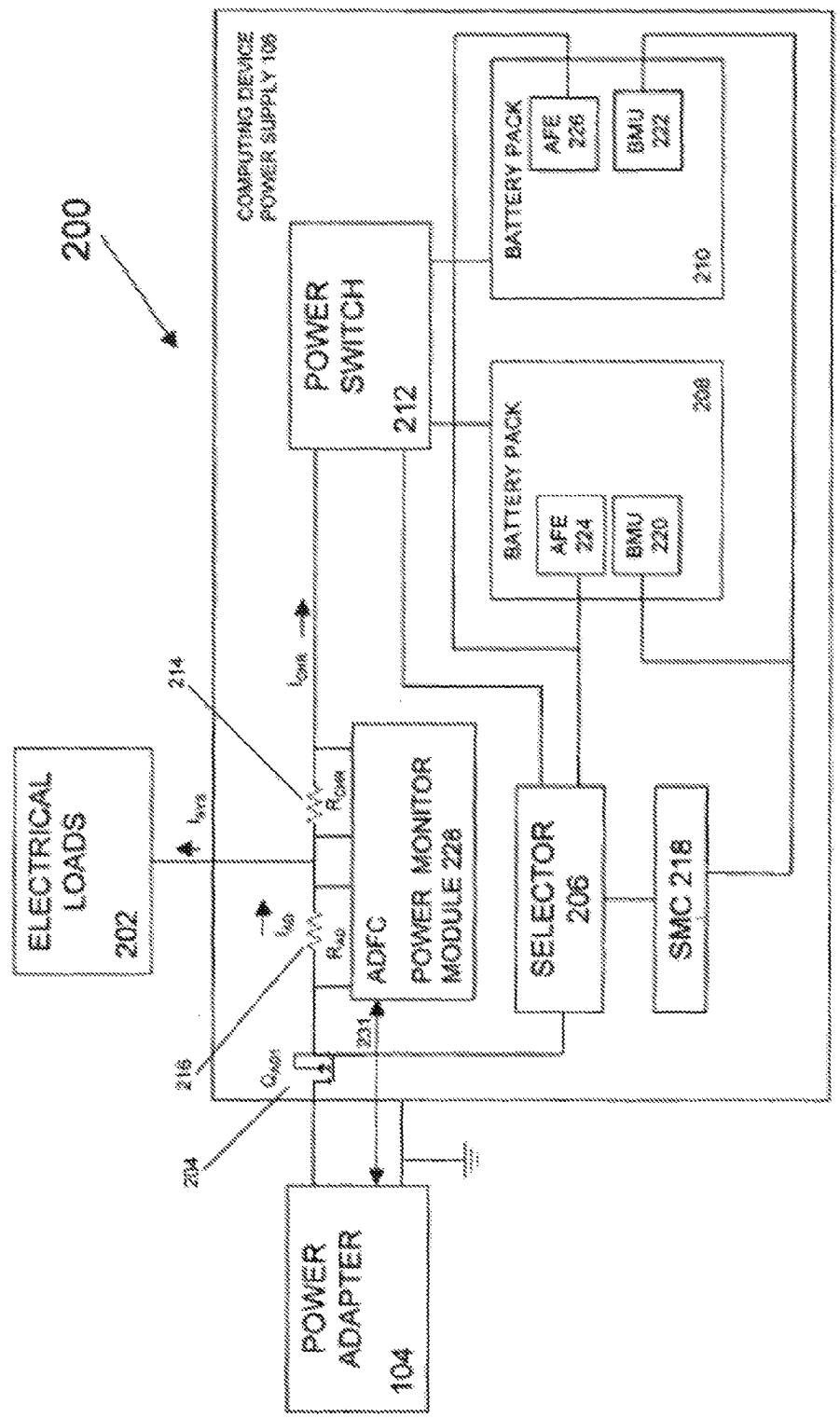
FIG. 2 illustrates a circuit schematic of a power system in accordance to one embodiment.

FIG. 2 illustrates a circuit schematic of a power system 200 in accordance with one embodiment. The power system 200 includes the power adapter 104 and the computing device power supply 106 discussed with reference to FIG. 1. In one embodiment, the power system 200 illustrates further details regarding the computing device power supply 106 of FIG. 1 that also includes new elements (for example, power monitor module 222) related to this invention.

The power system 200 includes electrical loads 202 coupled to the computing device power supply 106. The electrical loads 202 may represent various components of the computing device 102 of FIG. 1 which derive their power from the power adapter 104 (e.g., through the computing device power supply 106). For example, the electrical loads 202 may represent power usage by items 108-134 discussed with reference to FIG. 1 and a platform associated with those items. In one embodiment, one or more DC to DC voltage regulators may be utilized between the computing device power supply 106 and the electrical loads 202 (not shown), e.g., to regulate the voltage provided to the various components of the computing device 102. In another embodiment, the electrical loads 202 may represent power usage of a platform.

As illustrated in FIG. 2, the computing device power supply 106 may include a transistor 204 ($Q_{AD1}$) to switch the voltage potential provided by the power adapter 104. The negative voltage potential terminal of power adapter 104 is also connected to the power system 200, and may be connected to ground. The battery charger in the computing device 102 of FIG. 1 is eliminated and integrated into the power adapter 104 in FIG. 2. An additional feedback control line is added from the adapter 104 to ADFC pin 231 at the power monitor module 228. The output voltage of the adapter 104 is variable and directly controlled by the power monitor module 228. The transistor 204 may be any suitable transistor including a power transistor, such as a field effect transistor (FET), a metal oxide silicon FET (MOSFET), and the like. The gate of the transistor 204 ($Q_{AD1}$) is coupled to a selector 206 (alternatively, power monitor 228) to control the flow of current from the power adapter 104 into the computing device power supply 106.

The selector 206 is also coupled to one or more battery packs (208 and 210) and a power switch 212. The battery packs (208-210) may provide reserve power for the electrical loads 202, e.g., when the power adapter 104 is disconnected from the computing device power supply 106 and/or a power source (such as those discussed with reference to FIG. 1). The power switch 212 is coupled to the battery packs (208-210) and controlled by the selector 206 to switch power to and from the battery packs (208-210) on or off. For example, to provide reserve power (from the battery packs 208 and 210) to the electrical loads 202, e.g., through a resistor 214 ($R_{CHR}$), the selector 206 may switch on the power switch 212. Alternatively, when charging the battery packs (208-210), the selector 206 may turn on the power switch 212 to provide power to the battery packs (208-210) through the transistor 204 ($Q_{AD1}$), a resistor 216 ($R_{AD}$), and the resistor 214 ($R_{CHR}$).

The power adapter 104 output current lAD may be determined through resistor $R_{AD}$ 216. In the battery pack 208, 210 current $I_{CHR}$ may be determined by resistor $R_{CHR}$ 214. Thus, the current going to the electrical loads 202 is $I_{SYS}$. Therefore, the power adapter 104 output current $I_{AD}$ is equal to the total of the battery pack 208, 210 current $I_{CHR}$ and the electrical load 202 current $I_{SYS}$.

In this embodiment, the selector 206 may switch the flow of power from the power adapter 104 on or off based on the state of the battery packs (208-210) and/or the electrical loads. For example, if the battery packs (208-210) are fully charged and the electrical loads 202 are off (e.g., the computing device 102 is shut down), the selector 206 may switch off the flow of current from the power adapter 104 into the computing device power supply 106. Alternatively, if the battery packs (208-210) are to be charged and the electrical loads 202 are off (e.g., the computing device 102 is shut down), the selector 206 may switch on the transistor 204 and the power switch 212 to allow the flow of current from the power adapter 104 into the battery packs (208-210). In this embodiment, the power switch 212 may include a suitable transistor controlled by the selector 206 for each battery pack (208-210), including a power transistor, such as a FET, a MOSFET, and the like.

Furthermore, the selector 206 may determine when to switch between a plurality of battery packs (208-210). For example, when a battery pack (208 or 210) is removed from the computing device power supply 106, the selector 206 may switch to any remaining battery packs. The power switch 212 may be utilized to avoid safety issues (e.g., by having exposed battery terminal pins) when a battery pack is removed.

The computing device power supply 106 also includes a system management controller (SMC) 218 which is coupled to the battery packs (208-210) to monitor the current flow into and out of the battery packs to determine the charge level and capacity of each battery pack. In one embodiment, each battery pack may include a battery management unit (BMU) (220 and 222) to monitor the current flow through the battery pack. The SMC 218 is also coupled to the selector 206 to communicate the battery pack charge level and capacity information.

The selector 206 is coupled to an analog front end (AFE) (224 and 226) within each battery pack, e.g., to switch the flow of power between the battery packs and the power switch 212. In an embodiment, the AFEs (224 and 226) are coupled to the power switch through one or more suitable transistors, including a power transistor, such as a FET, a MOSFET, and the like.

The computing device power supply 106 additionally includes a power monitor module 228 coupled to measure the voltage across the resistors 214 and 216. In one embodiment, the resistors 214 and 216 have fixed values. The power monitor module 228 may be coupled to measure the current flow through the resistors 214 and 216. For example, the power monitor module 228 may monitor the total system power consumption (e.g., by measuring the voltage across the resistor 216) and the battery pack charging power (e.g., by measuring the voltage across the resistor 214).

The power monitor module 228 is coupled to the power adapter 104 through an adapter feedback control (ADFC) pin 231. The ADFC pin 231 may detect the power rating of the power adapter 104 and control the output voltage thus output power of the adapter 104. The power to the battery packs 208, 210 and the electrical loads 202 maybe controlled by adjusting the control current to the power adapter 104 through the ADFC pin 231.

If additional power (higher $I_{SYS}$) is desired by the electrical loads 202 and battery packs 208, 210, the power monitor module 228 may increase power adapter 104 output voltage (higher $I_{AD}$) by adjusting the current through the ADFC pin 231 until either the power demand is met or power rating of the adapter 104 is reached, whichever occurs first. When the electrical loads 202 power demand approaches the adapter power rating ($I_{SYS}$ approaches $I_{AD}$), the charge current $I_{CHR}$ may be reduced, if necessary, such that the power limit of the adapter 104 is not violated.

If the electrical loads 202 power demand ($I_{SYS}$) increases further to exceed the power rating of the adapter 104 ($I_{AD}$), the adapter voltage may be reduced such that the battery packs 208, 210 may be discharged to supply power to the electrical loads 202 to meet the power demand of the electrical loads 202. Therefore by controlling the output voltage of the adapter 104 to adjust the battery packs 208, 210 charging/discharging activities, it may be ensured that the power rating of the adapter 104 is not exceeded, the power requirement of the electrical loads 202 are satisfied and the battery pack 208, 210 are properly charged. In addition, there may be instances in which the power consumption of the computing device 102 may need to be modified in accordance with power supplying capability of the power adapter 104 and the status of the battery packs 208, 210.

Figure 3:
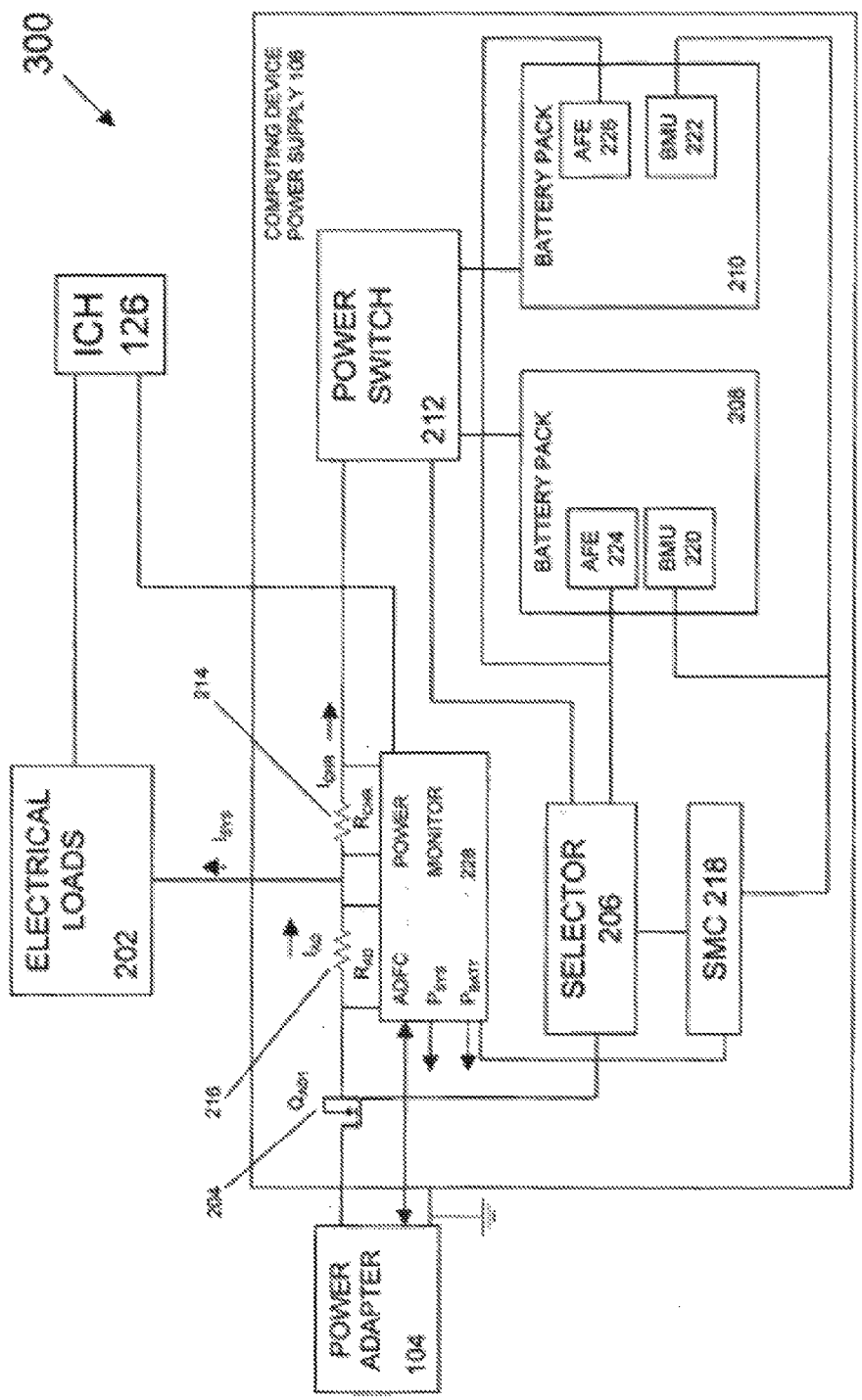
FIG. 3 illustrates a circuit schematic of a power system in accordance to a second embodiment.

FIG. 3 illustrates a circuit schematic of a power system 300 in accordance with a second embodiment. The power system 300 includes the power adapter 104 and the computing device power supply 106 discussed with reference to FIG. 1. In one embodiment, the power system 300 illustrates further details regarding the computing device power supply 106 of FIG. 1.

In some instances, the power required by the electrical loads 202 may not depend on either the adapter's 104 power capability or battery pack 208, 210 charging power. For these instances, the power demand for the electrical loads may need to be adjusted. The power adapter 104 and the battery packs 208, 210, together, may be unable to satisfy power demand of the electrical loads 202. For instance, if the battery packs 208, 210 power is depleted, or battery pack manufactures prefers not to interrupt the ongoing charging cycle of the battery packs 208, 210.

If the power demand of the electrical loads 202 is not managed, the power adapter 104 may be forced to shut down due to over loading, thereby leading to a system 100 shut down. In addition, if the total electrical loads 202 power exceeds the design limit permitted by thermal or other constraints, this may lead to internal component failure, which could also force the power adapter 104 to shut down.

As shown in FIG. 3, the power monitor module 228 manages power demand from the electrical loads 202. The power information ($P_{sys}$) may be provided by the power monitor 228 to the computing device power supply 106. The system power limit ($P_{SYS}$, $P_{BATT}$) may be communicated to the power monitor module 228 through the system management controller (SMC) 218. The system management controller 218 communicates the current flow into and out of the battery packs 208, 210 to determine the charge level and capacity of each battery pack.

A request to adjust electrical loads 202 power may be conveyed through, for example, input/output hub (ICH) 126. ICH 126 is able to provide an interface to I/O devices coupled to the computer system 100, such as the electrical loads 202. The electrical loads 202 (CPU, MCH, graphics, display, etc. including ICH itself) may adjust their activities until the power supply and demand is balanced. It should be noted that other devices may be used to facilitate the activities of the electrical loads 202. Accordingly, the embodiment provides a way to adjust the activities of the electrical loads 202 so that neither adapter power rating nor the electrical load power limit is exceeded while avoiding system shut down.

Advantageously, this embodiment enables electrical load power management by taking into consideration, power adapter's 104 power capability, battery packs 208, 210 status, and electrical loads 202 power requirement. This embodiment takes all three of these into consideration to balance power supply and demand on the electrical loads by adjusting the electrical loads 202 activities in active states.

Reference in the specification to "one embodiment" or "an embodiment" means that a particular feature, structure, or characteristic described in connection with the embodiment is included in at least an implementation. The appearances of the phrase "in one embodiment" in various places in the specification may or may not be all referring to the same embodiment.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus, comprising:
   a feedback pin to couple power monitor logic to a power adapter; and
   power management logic to:
      control an output voltage of the power adapter to control the power provided to one or more battery packs;
      control the power provided to one or more computing device electrical loads coupled to the one or more battery packs by adjusting a control current through the feedback pin; and
      manage power demands of the one or more computing device electrical loads coupled to the apparatus.

2. The apparatus of claim 1, comprising system management controller logic to:
   monitor current flow into and out of the one or more battery packs to determine a charge level and capacity of the one or more battery packs; and
   provide an indication of the capacity of the one or more battery packs to the power management logic.

3. The apparatus of claim 2, wherein the power management logic is to communicate a control directive to the one or more computing device electrical loads, wherein the control directive is to include an indication to adjust the activities of the one or more computing device electrical loads based on the capacity of the one or more battery packs.

4. The apparatus of claim 3, wherein the control directive includes an indication to adjust the activities of the one or more computing device electrical loads to balance a power demand of the one or more computing device electrical loads and a power supply of the one or more battery packs.

5. The apparatus of claim 4, wherein the power management logic is to control the output voltage of the power adapter based on one or more of an output power rating of the power adapter and based on the one or more computing device electric loads coupled to the apparatus.

6. The apparatus of claim 5, wherein the power management logic is to dynamically adjust the output voltage by adjusting a current until either the power demand is met or the power rating of the power adapter is reached, whichever occurs first.

7. The apparatus of claim 4, wherein the power management logic is to control the charging/discharging activities of the one or more battery packs to supply power to the one or more computing device electrical loads and to simultaneously provide power from the power adapter to the one or more computing device electrical loads.

8. The apparatus of claim 7, comprising:
   power switch logic coupled to the one or more battery packs; and
   selector logic to control the power switch logic to switch power to and from the one or more battery packs on or off.

9. A controller comprising:
   logic at least a portion of which is in hardware, the logic to:
   control an output voltage of a power adapter to control the charging/discharging activities of one or more battery packs;
   control the power provided to one or more computing device electrical loads coupled to the one or more battery packs by adjusting a control current through a feedback pin, the feedback pin coupling the logic to a power adapter; and
   manage power demands of the one or more computing device electrical loads.

10. The controller of claim 9, wherein the logic is to monitor current flow into and out of the one or more battery packs to determine a charge level and capacity of the one or more battery packs.

11. The controller of claim 10, wherein the logic is to communicate a control directive to the one or more computing device electrical loads, wherein the control directive is to include an indication to adjust the activities of the one or more computing device electrical loads based on the charge level and capacity of the one or more battery packs.

12. The controller of claim 11, wherein the control directive includes an indication to adjust the activities of the one or more computing device electrical loads to balance a power demand of the one or more computing device electrical loads and a power supply of the one or more battery packs.

13. The controller of claim 12, wherein the logic is to control the output voltage of the power adapter based on one or more of an output power rating of the power adapter and based on the one or more computing device electric loads.

14. The controller of claim 13, wherein the logic is to dynamically adjust the output voltage by adjusting a current until either the power demand is met or the power rating of the power adapter is reached, whichever occurs first.

15. The controller of claim 14, wherein the logic is to control the charging/discharging activities of the one or more battery packs to supply power to the one or more computing device electrical loads and simultaneously provide power from the power adapter to the one or more computing device electrical loads.

16. The controller of claim 14, wherein the logic is to switch a flow of power from the power adapter on or off based on a status of the one or more battery packs or based on a status of the one or more computing device electrical loads coupled to the apparatus.

17. An article comprising a non-transitory computer-readable storage medium containing a plurality of instructions that in response to being executed enable a system to:
   control an output voltage of a power adapter to control the charging/discharging activities of one or more battery packs;
   control the power provided to one or more computing device electrical loads coupled to the one or more battery packs by adjusting a control current through a feedback pin, the feedback pin coupling the one or more battery packs to a power adapter; and
   manage power demands of the one or more computing device electrical loads.

18. The article of claim 17, comprising instructions that if executed enable the system to monitor current flow into and out of the one or more battery packs to determine a charge level and capacity of the one or more battery packs.

19. The article of claim 18, comprising instructions that if executed enable the system to communicate a control directive to the one or more computing device electrical loads, the control directive to include an indication to adjust the activities of the one or more computing device electrical loads based on the charge level and capacity of the one or more battery packs.

20. The article of claim 19, wherein the control directive includes an indication to adjust the activities of the one or more computing device electrical loads to balance a power demand of the one or more computing device electrical loads and a power supply of the one or more battery packs.

* * * * *